(12) United States Patent
Bradley et al.

(10) Patent No.: US 7,165,729 B2
(45) Date of Patent: Jan. 23, 2007

(54) COMMUNICATION TRANSACTION CONTROL BETWEEN INDEPENDENT DOMAINS OF AN INTEGRATED CIRCUIT

(75) Inventors: Daryl Wayne Bradley, Willingham (GB); Richard Roy Grisenthwaite, Guilden Morden (GB); Sheldon James Woodhouse, Stow-Cum-Quy (GB)

(73) Assignee: ARM Limited, Cambridge (GB)

( * ) Notice: Subject to any disclaimer, the term of this patent is extended or adjusted under 35 U.S.C. 154(b) by 187 days.

(21) Appl. No.: 11/045,580

(22) Filed: Jan. 31, 2005

(65) Prior Publication Data

US 2006/0049264 A1    Mar. 9, 2006

(30) Foreign Application Priority Data

Sep. 8, 2004    (GB)    ................. 0419932.9

(51) Int. Cl.
*G06K 19/06* (2006.01)
(52) U.S. Cl. ...................... 235/492; 235/376
(58) Field of Classification Search ............... 235/376, 235/474, 476, 487, 492
See application file for complete search history.

(56) References Cited

U.S. PATENT DOCUMENTS

| | | | |
|---|---|---|---|
| 5,406,064 A * | 4/1995 | Takahashi | 235/492 |
| 5,420,412 A * | 5/1995 | Kowalski | 235/492 |
| 6,009,477 A | 12/1999 | Sarangdhar et al. | |
| 6,122,690 A | 9/2000 | Nannetti et al. | |
| 6,454,172 B1 * | 9/2002 | Maeda et al. | 235/492 |
| 6,601,771 B1 * | 8/2003 | Charrin | 235/492 |
| 2004/0193836 A1 | 9/2004 | Ramanadin | |

* cited by examiner

*Primary Examiner*—Daniel Stcyr
(74) *Attorney, Agent, or Firm*—Nixon & Vanderhye P.C.

(57) ABSTRACT

Within an integrated circuit 2 independently controllable domains 4, 6, 8, 10, 12, 14 may be unable to complete pending transactions taking place between domains. Each domain is provided with a transaction level state machine 20, 22 which is responsive to the state of the state machine within the other domain and when this indicates that the other domain is not capable of communicating triggers default behavior ensuring that the predetermined transaction protocol is not broken.

24 Claims, 2 Drawing Sheets

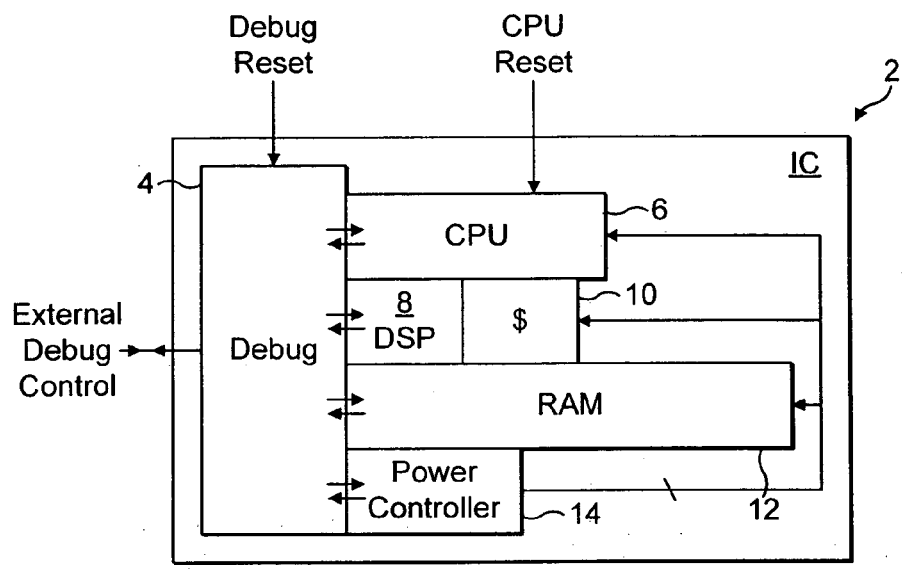
FIG. 1
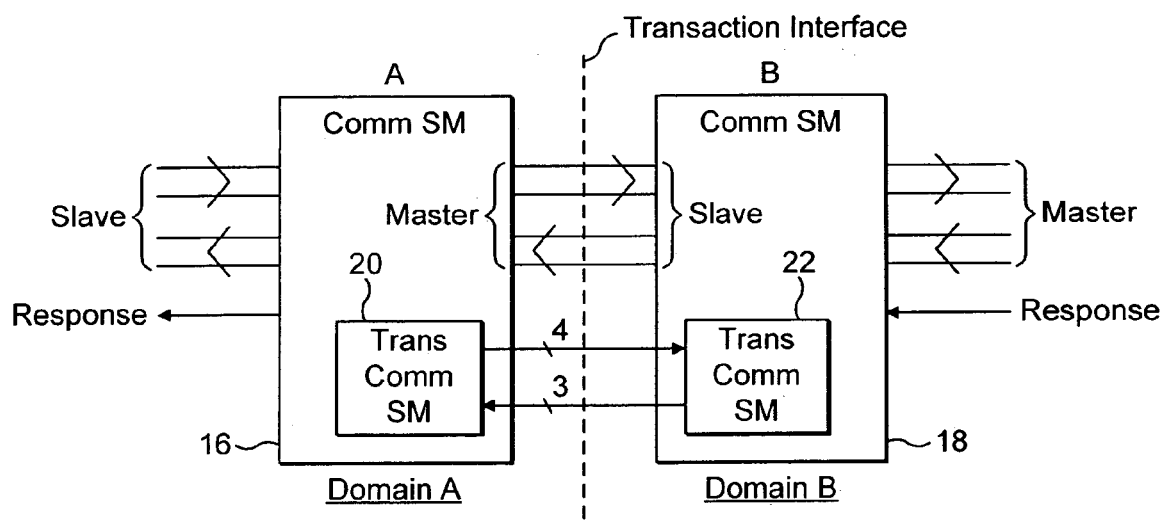
FIG. 2
| A Encoding | | B Encoding | |
|---|---|---|---|
| A Initialise | 0001 | B Initialise | 001 |
| A Ready | 0010 | B Ready | 010 |
| A Busy | 0100 | B Busy | 100 |
| A Hold | 1000 | | |
FIG. 4

COMMUNICATION TRANSACTION CONTROL BETWEEN INDEPENDENT DOMAINS OF AN INTEGRATED CIRCUIT

BACKGROUND OF THE INVENTION

1. Field of the Invention

This invention relates to the field of integrated circuits. More particularly, this invention relates to a communication transaction control between independently controllable circuit domains within an integrated circuit.

2. Description of the Prior Art

As integrated circuits have increased in complexity, it has become more common to divide such circuits into multiple independently controllable domains. These domains can be independently controllable in the sense that they may be subject to independent power control, independent clocking (asynchronous and/or different speeds), independent resets or combinations of the above or other control parameters. The separate domains may, for example, contain circuit elements such as a DSP circuit, a general purpose CPU, peripheral interface circuits and the like, which can be selectively powered down when not in use, subject to different clocking speeds or subject to independent reset signals depending upon the circumstances. Whilst such different domains are subject to this independent control, they are also required to communicate with each other via communication transactions and in accordance with predetermined transaction protocols. It is advantageous if the different circuit elements standardise their transaction protocol so as to facilitate design reuse and interoperability. An example of such transaction protocols are the AMBA transaction protocols originated by ARM Limited, Cambridge, England, such as the AHB protocol. Such transaction protocols typically require a predetermined sequence of signals to be generated and responses received by each party until the transaction completes. If one or more of these signals is in someway lost, then the transaction protocol is not complied with and an erroneous operation can occur, e.g. in a severe case an entire communication bus may be locked up due to an incomplete transaction.

One approach to dealing with this problem is to seek to ensure that each circuit taking part in the transaction fully completes every transaction which it has started before being disrupted by any other influence. As an example, a circuit element may defer being powered down or reset until it has completed all of its pending transactions. However, this requirement can introduce significant disadvantageous complexity and/or other performance problems, such as inadvertently delaying a required reset for an indeterminate period of time.

SUMMARY OF THE INVENTION

Viewed from one aspect the present invention provides an integrated circuit comprising:

a first domain including a first communication circuit;

a second domain including a second communication circuit operable to communicate with said first communication circuit via a transaction interface using communication transactions in accordance with a transaction protocol;

a first state machine operable to move between states indicative of transaction level communication status of said first communication circuit; and a second state machine operable to move between states indicative of transaction level communication status of said second communication circuit; wherein said first domain and said second domain are separately controllable such that at least said second communication circuit may independently move to a state in which it cannot communicate via said transaction interface; and movement between states of said first state machine is at least partly controlled by a current state of said second state machine such if said second communication circuit changes to a state in which it cannot communicate via said transaction interface part way through a pending communication transaction between said first communication circuit and said second communication circuit, then said first state machine makes an associated move between states and said first communication circuit continues processing of said pending communication transaction in accordance with a predetermined default behaviour and in a manner compliant with said transaction protocol.

The present technique provides state machines for the respective circuits on each side of a communication transaction interface with those state machines being responsive to the communication status of the other circuit in the way in which they move between states. These state machines can be considered transaction level state machines which are arranged to operate to monitor the other party to the transaction and to force transaction completion through predetermined default behaviour when the other party to that transaction becomes unable to communicate. In this way, independent control of the different domains can be preserved without undue constraint and yet well defined completed behaviour for pending transactions can be ensured.

In some integrated circuit embodiments it may be that only one party to the transaction is likely to become non-responsive. However, in a preferred system the behaviour is more symmetric with either party being able to deal with the other party becoming non-responsive, or otherwise not able to communicate.

As previously mentioned, the different domains may be independently controllable in a wide variety of ways, which may make them non-communicative. Particularly common circumstances with which it is desired to deal are ones arising from independent resets, independent power downs and independent clocking.

The predetermined default behaviour can take a wide variety of different forms. Particularly preferred forms are returning a transaction error response, returning no response and/or returning a predetermined default response. Depending upon the nature of the transaction concerned across the transaction interface in question, different ones of these default behaviours may be used.

In many common transaction scenarios one circuit will be a transaction master circuit and one circuit will be a transaction slave circuit with respect to passing the pending communication transaction across the transaction interface. In this context, a transaction master circuit serving as the first communication circuit and including the first state machine is provided with a holding state into which it moves in response to the second state machine moving into a state indicative of either the second communication circuit being in a busy state or being unable to communicate, and from which holding state a move is made in response to the second state machine moving to a state indicative of either the second communication circuit being ready to receive a further communication transaction or being unable to communicate.

The first state machine serving as a transaction master within preferred embodiments moves from a ready state to a busy state when the second communication circuit is in a ready state and a communication transaction is initiated.

In embodiments in which the second communication circuit is a transaction slave, said second state machine preferably moves from a ready state to a busy state when the first state machine moves to a busy state.

Following on from this, the second state machine preferably moves from a busy state to a ready state when the first state machine is in the holding state or is unable to communicate and processing of a pending transaction has been completed by the second communication circuit.

In order to increase the robustness of the communication between the first state machine and the second state machine this communication uses hot one encoded signals to pass respective state information therebetween with signals not conforming to one hot encoding being ignored.

The present technique is particularly useful in embodiments in which one of the domains is a debug circuit domain. Debug circuit domains often have a requirement to be independently controlled relative to the integrated circuit as a whole and can be disruptive if transactions involving the debug circuit are allowed to interfere with the normal operations of the circuit that are non-debug related.

It will be appreciated that the first state machine and the second state machine could either or both be part of larger state machines controlling the overall communication of their respective circuits.

Viewed from another aspect the present invention provides a method of operating an integrated circuit having a first domain including a first communication circuit and a second domain including a second communication circuit, said method comprising the steps of:

communicating between said first communication circuit and said second communication circuit via a transaction interface using communication transactions in accordance with a transaction protocol;

moving a first state machine between states indicative of transaction level communication status of said first communication circuit; and moving a second state machine between states indicative of transaction level communication status of said second communication circuit; wherein said first domain and said second domain are separately controllable such that at least said second communication circuit may independently move to a state in which it cannot communicate via said transaction interface; and movement between states of said first state machine is at least partly controlled by a current state of said second state machine such if said second communication circuit changes to a state in which it cannot communicate via said transaction interface part way through a pending communication transaction between said first communication circuit and said second communication circuit, then said first state machine makes an associated move between states and said first communication circuit continues processing of said pending communication transaction in accordance with a predetermined default behaviour and in a manner compliant with said transaction protocol.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 schematically illustrates an integrated circuit including multiple circuit domains;

FIG. 2 schematically illustrates communication state machines for controlling transfer of a communication transaction between circuit domains;

FIG. 4 illustrates an example of one hot encoding which may be used to pass state signals between transaction level state machines.

DESCRIPTION OF PREFERRED EMBODIMENTS

Figure 3:
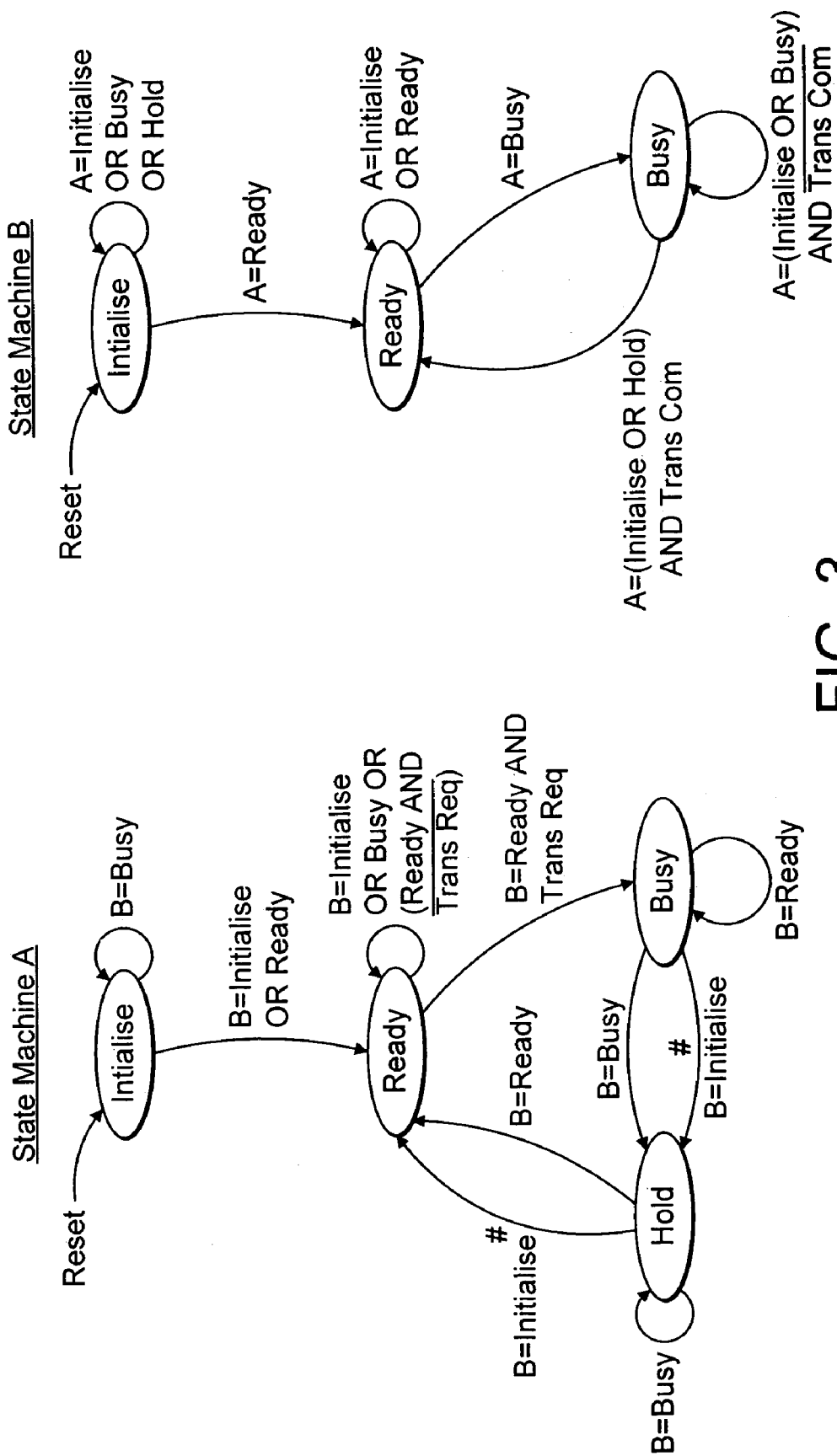
FIG. 3 schematically illustrates different communication status states which are adopted by transaction level state machines within the circuits of FIG. 2.

FIG. 1 schematically illustrates an integrated circuit 2 comprising multiple circuit domains including a debug circuit 4, a CPU 6, a DSP 8, a cache memory 10, a random access memory 12 and a power controller 14. These different circuit elements in their respective domains are subject to independent control, e.g. the debug domain 4 and the CPU 6 have respective independent reset signals as illustrated. The power controller 14 also operates to independently power-up or power-down the different circuit domains 6, 8, 10, 12 as well as to vary the clocking speeds to these different domains, including stopping the clocks completely. Resets may also be controlled from 14.

As illustrated by the bi-directional arrows in FIG. 1, the debug circuit 4 communicates with various of the other circuit elements in their respective domains via communication transactions which conform to a fixed transaction protocol, e.g. an AHB protocol. The bus infrastructure via which these transaction communications take place for the debug circuit 4 is shared with the normal operation of communication infrastructure and accordingly it is important that problems with uncompleted transactions involving the debug circuit 4 do not interfere with this infrastructure in a way that would upset normal operation.

FIG. 2 schematically illustrates communication controlling state machines 16, 18 for controlling a communication transaction passing between a first domain A and a second domain B. This transaction can use a variety of transaction protocols. Such transaction protocols typically require a predetermined sequence of signals to be exchanged in either direction, e.g. including address, data, response, error and other signals. As well as controlling in the transactions to be communicated in accordance with these predetermined protocols, the state machines 16, 18 also include transaction level state machines 20, 22 which serve to monitor the other parties ability to continue to communicate and to complete pending transactions. One hot encoded status signals are exchanged between these transaction level state machines 20, 22 so that they can respond to each other's state and control their own respective higher level state machines 16, 18 to respond appropriately to the other party not being able to complete a pending transaction. Examples of appropriate default behaviour when the other party is unable to complete the transaction include returning an error response, returning no response or returning a predetermined default response. Depending upon the nature of the transaction being conducted, or the circuit concerned, any of these options may be triggered, or alternatively different default behaviours may be used.

FIG. 3 schematically illustrates the different states adopted by the transaction level state machines 20, 22, 23 of FIG. 2 in this example embodiment. The state machine for domain A in the context of communication transactions passing across the transaction interface of FIG. 2 can be considered to be the master which initiates the transaction.

As will be seen, both of the state machines 20, 22 reset into an initialised state. For domain A, the state machine 20 remains in this state until the state machine 22 for the domain B is either initialised or enters its ready state. The state machine 22 for domain B remains in the initialised state until the state machine 20 for domain A enters its ready state.

The state machine 20 for domain A moves from its ready state to its busy state when it is detected that the state machine 22 for domain B is in its ready state and a transaction request is initiated within domain A to be passed to domain B across the transaction interface in question as illustrated in FIG. 2. The state machine 20 for domain A will then remain in this busy state until either the state machine 22 for domain B enters its busy state or its initialised state, at which time the state machine 20 for domain A passes to its hold state. If the move to the hold state is as a consequence of the state machine 22 for domain B moving to the initialised state, then this indicates that domain B will not be able to complete the pending transaction and accordingly a default response is triggered (as indicated by the "#" in the drawing). These default behaviours are as previously discussed.

Domain A will remain with its state machine 20 in the hold state whilst domain B is busy until domain B either moves to the ready state or is initialised. If initialisation of domain B occurs, then again this indicates non-completion of the pending transaction and default behaviour is triggered.

The behaviour of state machine 22 for domain B is slightly different/simpler. Having passed through its initialised state, the state machine 22 for domain B remains in the ready state until the state machine 20 for domain A becomes busy. At this time the state machine 22 for domain B moves to the busy state and remains there until the state machine 20 for domain A is in either its initialised state or its holding state and the pending transaction has been detected as being completed. The state machine 22 for domain B then returns to the ready state. This behaviour of remaining In the busy state and waiting until the transaction completes irrespective of whether the state machine 20 for domain A indicates that domain A has been initialised allows domain B to complete its intended transaction behaviour irrespective of the fact that domain A is now not able to complete its part of the transaction.

FIG. 4 schematically illustrates one example of one hot encoding which may be used to communicate the transaction level state machine states between the transaction level state machines 20, 22 shown in FIG. 2. It will be appreciated that other one hot encodings and other forms of encodings may be used. If more than two bits are "1" at any different time, then such signals are ignored as they do not correspond to valid states and are not used to move the transaction level state machines 20, 22 between states.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
a first domain including a first communication circuit;
a second domain including a second communication circuit operable to communicate with said first communication circuit via a transaction interface using communication transactions in accordance with a transaction protocol;
a first state machine operable to move between states indicative of transaction level communication status of said first communication circuit; and
a second state machine operable to move between states indicative of transaction level communication status of said second communication circuit; wherein
said first domain and said second domain are separately controllable such that at least said second communication circuit may independently move to a state in which said second communication circuit cannot communicate via said transaction interface; and
movement between states of said first state machine is at least partly controlled by a current state of said second state machine such if said second communication circuit changes to a state in which said second communication circuit cannot communicate via said transaction interface part way through a pending communication transaction between said first communication circuit and said second communication circuit, then said first state machine makes an associated move between states and said first communication circuit continues processing of said pending communication transaction in accordance with a predetermined default behaviour and in a manner compliant with said transaction protocol.

2. An integrated circuit as claimed in claim 1, wherein movement between states of said second state machine is at least partly controlled by a current state of said first state machine such if said first communication circuit changes to a state in which said first communication circuit cannot communicate via said transaction interface part way through a pending communication transaction between said first communication circuit and said second communication circuit, then said second state machine makes an associated move between states and said second communication circuit continues processing of said pending communication transaction in accordance with, a predetermined default behaviour and in a manner compliant with said transaction protocol.

3. An integrated circuit as claimed in claim 1, wherein said first domain and said second domain are separately controllable in respect of at least one of:
being independently resetable;
being independently selectively powered down; and
being independently clocked.

4. An integrated circuit as claimed in claim 1, wherein said predetermined default behaviour comprises one of:
returning a transaction error response;
returning no response; and
returning a predetermined default response.

5. An integrated circuit as claimed in claim 1, wherein said first communication circuit and said second communication circuit are respective ones of a transaction master circuit and a transaction slave circuit with respect to passing said pending communication transaction across said transaction interface.

6. An integrated circuit as claimed in claim 5, wherein said first communication circuit is a transaction master circuit and said first state machine moves to a holding state in response to said second state machine moving to a state indicative of either said second communication circuit processing said pending communication transaction or being unable to communicate and moves from said holding state in response to said second state machine moving to a state indicative of either said second communication circuit being ready to receive a further communication transaction or being unable to communicate.

7. An integrated circuit as claimed in claim 6, wherein said first state machine moves from a ready state to a busy state when said second communication circuit is in a ready state and a communication transaction is initiated.

8. An integrated circuit as claimed in claim 5, wherein said second communication circuit is a transaction slave circuit and said second state machine moves from a ready state to a busy state when said first state machine moves to a busy state.

9. An integrated circuit as claimed in claim 6, wherein said second state machine moves from a busy state to a ready state when said first state machine is in said holding state or is unable to communicate and processing of said pending transaction has been completed by said second communication circuit.

10. An integrated circuit as claimed in claim 1, wherein said first state machine and said second state machine communicate their respective states via one hot encoding signals with signals not conforming to one hot encoding being ignored.

11. An integrated circuit as claimed in claim 1, wherein one of said first domain and said second domain comprises a debug circuit domain.

12. An integrated circuit as claimed in claim 1, wherein said first state machine is part of a first communication state machine controlling communication by said first communication circuit in accordance with said transaction protocol and said second state machine is part of a second communication state machine controlling communication by said second communication circuit in accordance with said transaction protocol.

13. A method of operating an integrated circuit having a first domain including a first communication circuit and a second domain including a second communication circuit, said method comprising the steps of:
communicating between said first communication circuit and said second communication circuit via a transaction interface using communication transactions in accordance with a transaction protocol;
moving a first state machine between states indicative of transaction level communication status of said first communication circuit; and
moving a second state machine between states indicative of transaction level communication status of said second communication circuit; wherein
said first domain and said second domain are separately controllable such that at least said second communication circuit may independently move to a state in which said second communication circuit cannot communicate via said transaction interface; and
movement between states of said first state machine is at least partly controlled by a current state of said second state machine such if said second communication circuit changes to a state in which said second communication circuit cannot communicate via said transaction interface part way through a pending communication transaction between said first communication circuit and said second communication circuit, then said first state machine makes an associated move between states and said first communication circuit continues processing of said pending communication transaction in accordance with a predetermined default behaviour and in a manner compliant with said transaction protocol.

14. A method as claimed in claim 13, wherein movement between states of said second state machine is at least partly controlled by a current state of said first state machine such if said first communication circuit changes to a state in which said first communication circuit cannot communicate via said transaction interface part way through a pending communication transaction between said first communication circuit and said second communication circuit, then said second state machine makes an associated move between states and said second communication circuit continues processing of said pending communication transaction in accordance with a predetermined default behaviour and in a manner compliant with said transaction protocol.

15. A method as claimed in claim 13, wherein said first domain and said second domain are separately controllable in respect of at least one of:
being independently resetable;
being independently selectively powered down; and
being independently clocked.

16. A method as claimed in claim 13, wherein said predetermined default behaviour comprises one of:
returning a transaction error response;
returning no response; and
returning a predetermined default response.

17. A method as claimed in claim 13, wherein said first communication circuit and said second communication circuit are respective ones of a transaction master circuit and a transaction slave circuit with respect to passing said pending communication transaction across said transaction interface.

18. A method as claimed in claim 17, wherein said first communication circuit is a transaction master circuit and said first state machine moves to a holding state in response to said second state machine moving to a state indicative of either said second communication circuit processing said pending communication transaction or being unable to communicate and moves from said holding state in response to said second state machine moving to a state indicative of either said second state machine moving to a state indicative of said second communication circuit being ready to receive a further communication transaction or being unable to communicate.

19. A method as claimed in claims 18, wherein said first state machine moves from a ready state to a busy state when said second communication circuit is in a ready state and a communication transaction is initiated.

20. A method as claimed in claim 17, wherein said second communication circuit is a transaction slave circuit and said second state machine moves from a ready state to a busy state when said first state machine moves to a busy state.

21. A method as claimed in claim 18, wherein said second state machine moves from a busy state to a ready state when said first state machine is in said holding state or is unable to communicate and processing of said pending transaction has been completed by said second communication circuit.

22. A method as claimed in claim 13, wherein said first state machine and said second state machine communicate their respective states via one-hot encoding signals with signals not conforming to one hot encoding being ignored.

23. A method as claimed in claims 13, wherein one or said first domain and said second domain comprises a debug circuit domain.

24. A method as claimed in claim 13, wherein said first state machine is part of a first communication state machine controlling communication by said first communication circuit in accordance with said transaction protocol and said second state machine is part of a second communication state machine controlling communication by said second communication circuit in accordance with said transaction protocol.

* * * * *

UNITED STATES PATENT AND TRADEMARK OFFICE
CERTIFICATE OF CORRECTION

PATENT NO. : 7,165,729 B2 Page 1 of 1
APPLICATION NO. : 11/045580
DATED : January 23, 2007
INVENTOR(S) : Bradley et al.

It is certified that error appears in the above-identified patent and that said Letters Patent is hereby corrected as shown below:

Column 6, line 17, "such" should read --such that--;

Column 6, line 32, "such" should read --such that--;

Column 7, line 54, "such" should read --such that--;

Column 8, line 1, "such" should read --such that--.

Signed and Sealed this

Eighteenth Day of December, 2007

JON W. DUDAS
*Director of the United States Patent and Trademark Office*